(12) United States Patent
Duenas et al.

(10) Patent No.: US 11,934,248 B2
(45) Date of Patent: *Mar. 19, 2024

(54) PERFORMANCE AND POWER TUNING USER INTERFACE

(71) Applicant: ATI Technologies ULC, Markham (CA)

(72) Inventors: Alexander S. Duenas, Markham (CA); Omer Irshad, Markham (CA); Sishanthy Balachandran, Markham (CA); Arpit Nitinbhai Patel, Markham (CA); Andrew Savio D'Souza, Markham (CA); Oleksandr Khodorkovsky, Markham (CA)

(73) Assignee: ATI Techologies ULC, Markham (CA)

( * ) Notice: Subject to any disclaimer, the term of this patent is extended or adjusted under 35 U.S.C. 154(b) by 40 days.

This patent is subject to a terminal disclaimer.

(21) Appl. No.: 17/486,175

(22) Filed: Sep. 27, 2021

(65) Prior Publication Data

US 2022/0011846 A1 Jan. 13, 2022

Related U.S. Application Data

(63) Continuation of application No. 16/213,828, filed on Dec. 7, 2018, now Pat. No. 11,132,047.

(51) Int. Cl.
*G06F 1/32* (2019.01)
*G06F 1/28* (2006.01)
*G06F 1/3231* (2019.01)
*G06F 9/451* (2018.01)
*G06F 3/0484* (2022.01)

(52) U.S. Cl.
CPC .............. *G06F 1/3231* (2013.01); *G06F 1/28* (2013.01); *G06F 9/451* (2018.02); *G06F 3/0484* (2013.01)

(58) Field of Classification Search
CPC ................. G06F 1/32; G06F 9/44; G06F 1/12
See application file for complete search history.

(56) References Cited

U.S. PATENT DOCUMENTS

| | | | |
|---|---|---|---|
| 2005/0251697 A1 | 11/2005 | Narukawa et al. | |
| 2008/0049027 A1 | 2/2008 | Hauke | |
| 2010/0102790 A1* | 4/2010 | Buterbaugh | H02M 3/1584 323/283 |
| 2011/0125872 A1* | 5/2011 | Wang | G06F 16/10 709/219 |
| 2011/0270549 A1 | 11/2011 | Jeansonne et al. | |
| 2014/0095914 A1 | 4/2014 | Andou et al. | |
| 2014/0181545 A1 | 6/2014 | Shrall et al. | |
| 2014/0208135 A1* | 7/2014 | Keil | G06F 1/3234 713/320 |
| 2018/0196591 A1 | 7/2018 | Hernandez et al. | |

* cited by examiner

*Primary Examiner* — Keshab R Pandey
(74) *Attorney, Agent, or Firm* — Volpe Koenig (57) ABSTRACT

Power management in a computing device. A driver is registered with an operating system (OS) executing on the computing device to receive information about a position of a user interface control. If the user interface control is moved, the driver receives a notification of the user interface control position and determines a power management intervention based on the position The driver transmits the power management intervention to power control circuitry which sets a power setting of the computing device based on the intervention.

20 Claims, 9 Drawing Sheets

PERFORMANCE AND POWER TUNING USER INTERFACE

CROSS REFERENCE TO RELATED APPLICATIONS

This application claims the benefit of U.S. patent application Ser. No. 16/213,828, filed Dec. 7, 2018, the content of which is hereby incorporated by reference herein.

BACKGROUND

Mobile computing devices, such as laptop and tablet computers, smart phones, portable gaming consoles, and other mobile devices, are becoming increasingly popular as their capabilities increase. Improved processor and display screen performance have contributed to the increased popularity of such devices. Such increases in performance, along with increased utilization and user reliance, have resulted in increased power consumption by such devices. The portable nature of such devices translates this increased power consumption into increased demand on battery charge. Such computing systems typically include power management functions to address these increased demands. These functions are also applicable to non-mobile computing systems.

BRIEF DESCRIPTION OF THE DRAWINGS

A more detailed understanding can be had from the following description, given by way of example in conjunction with the accompanying drawings wherein.

DETAILED DESCRIPTION

Some implementations provide a method for power management in a computing device. A driver is registered with an operating system executing on the computing device to receive information about a position of a user interface control. If the user interface control is moved, an operating system (OS) of the computing device detects the user interface control position and transmits a notification of the user interface control position to the driver. The driver receives the notification of the user interface control position from the OS, determines a power management intervention based on the position, and transmits the determined power management intervention to power control circuitry. The power control circuitry sets a power setting of the computing device based on the determined power management intervention.

Some implementations provide a computing device configured for power management. The computing device includes circuitry for registering a driver with an operating system executing on the computing device to receive information about a position of a user interface control. The computing device also includes circuitry which, if the user interface control is moved, detects, by an OS of the computing device, the user interface control position, transmits, by the OS to the driver, a notification of the user interface control position, receives the notification of the user interface control position, by the driver from the OS, determines, by the driver, a power management intervention based on the position, transmits, by the driver to power control circuitry, the determined power management intervention, and sets, by the power control circuitry a power setting of the computing device based on the intervention.

Figure 1:
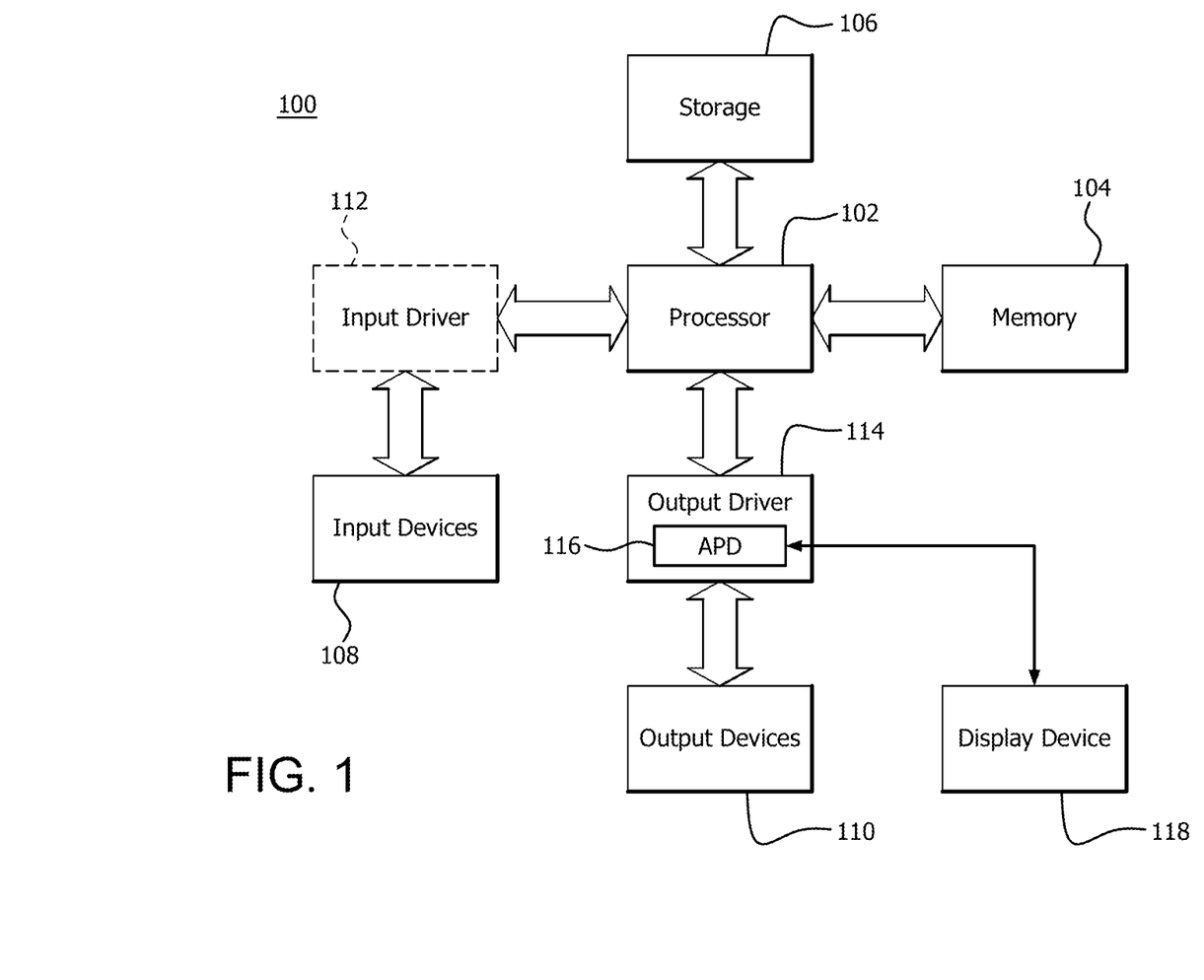
FIG. 1 is a block diagram of an example device in which one or more disclosed embodiments can be implemented.

FIG. 1 is a block diagram of an example device 100 in which one or more disclosed embodiments can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

The processor 102 can include a central processing unit (CPU), a graphics processing unit (GPU), a CPU and GPU located on the same die, or one or more processor cores, wherein each processor core can be a CPU or a GPU. The memory 104 can be located on the same die as the processor 102, or can be located separately from the processor 102. The memory 104 can include a volatile or non-volatile memory, for example, random access memory (RAM), dynamic RAM, or a cache.

The storage 106 can include a fixed or removable storage, for example, a hard disk drive, a solid state drive, an optical disk, or a flash drive. The input devices 108 can include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 can include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, the functionality described as being performed by the APD 116 may also be performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm may perform the functionality described herein.

Figure 2:
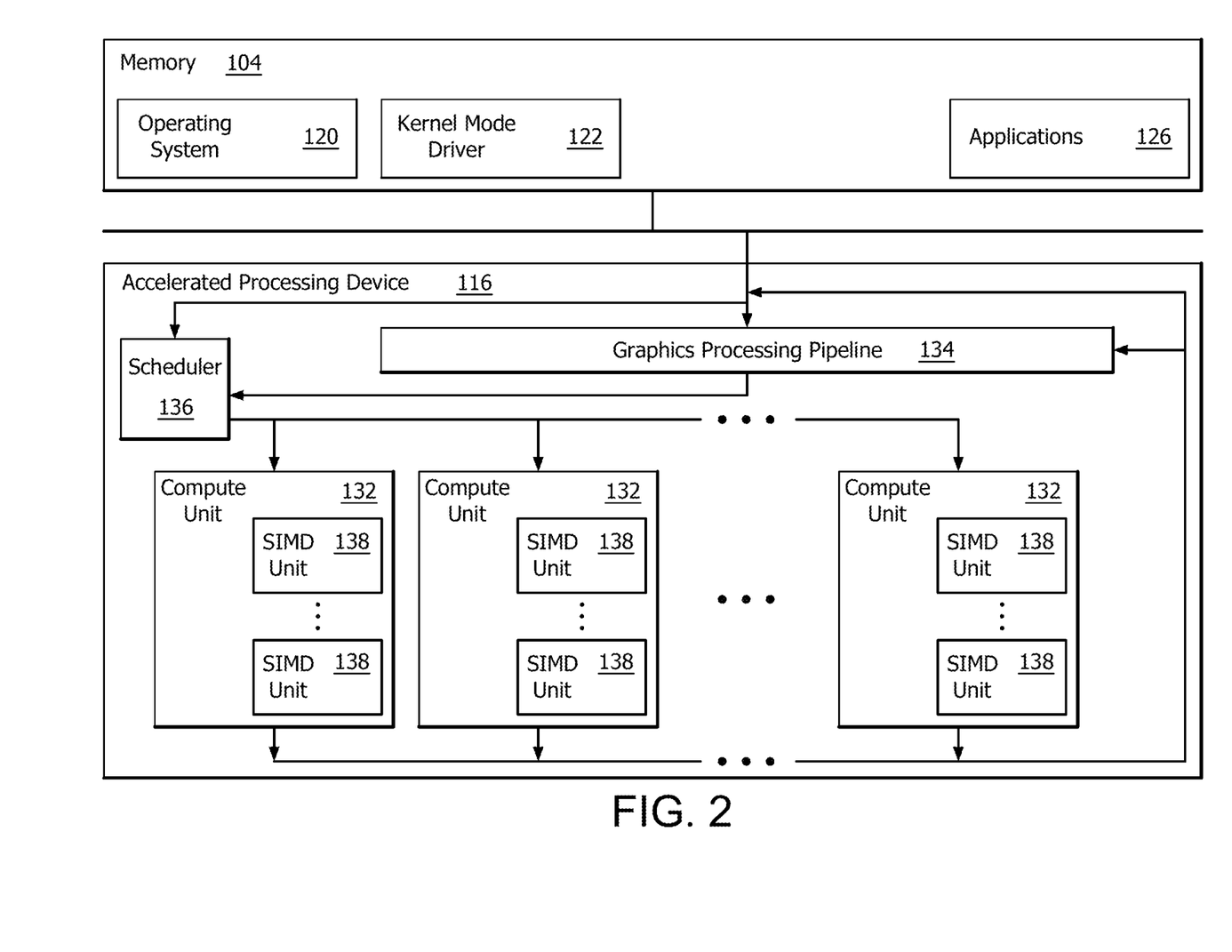
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various aspects of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116. In some implementations, processor 102 is an accelerated processing unit (APU) which includes both a CPU and GPU, and APD 116 is implemented on the GPU.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. Multiple wavefronts may be included in a "work group," which includes a collection of work-items designated to execute the same program. A work group can be executed by executing each of the wavefronts that make up the work group. The wavefronts may be executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. A graphics pipeline 134 which accepts graphics processing commands from the processor 102 may thus provide computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

In order to balance increased power consumption and battery charge with the need or desire for computing performance, some computing devices provide an interface through which a user is able to specify a preference for computing performance or a preference for power efficiency. A user may wish to specify a preference for computing performance, for example, if they are using a program that requires maximum computing power (e.g., 3D gaming, simulations, real time applications, etc.). The user may wish to specify a preference for power efficiency if, for example, they are using the computing device on battery power and/or are using a program that does not require maximum computing power (e.g., word processing, email, etc.).

Figure 3:
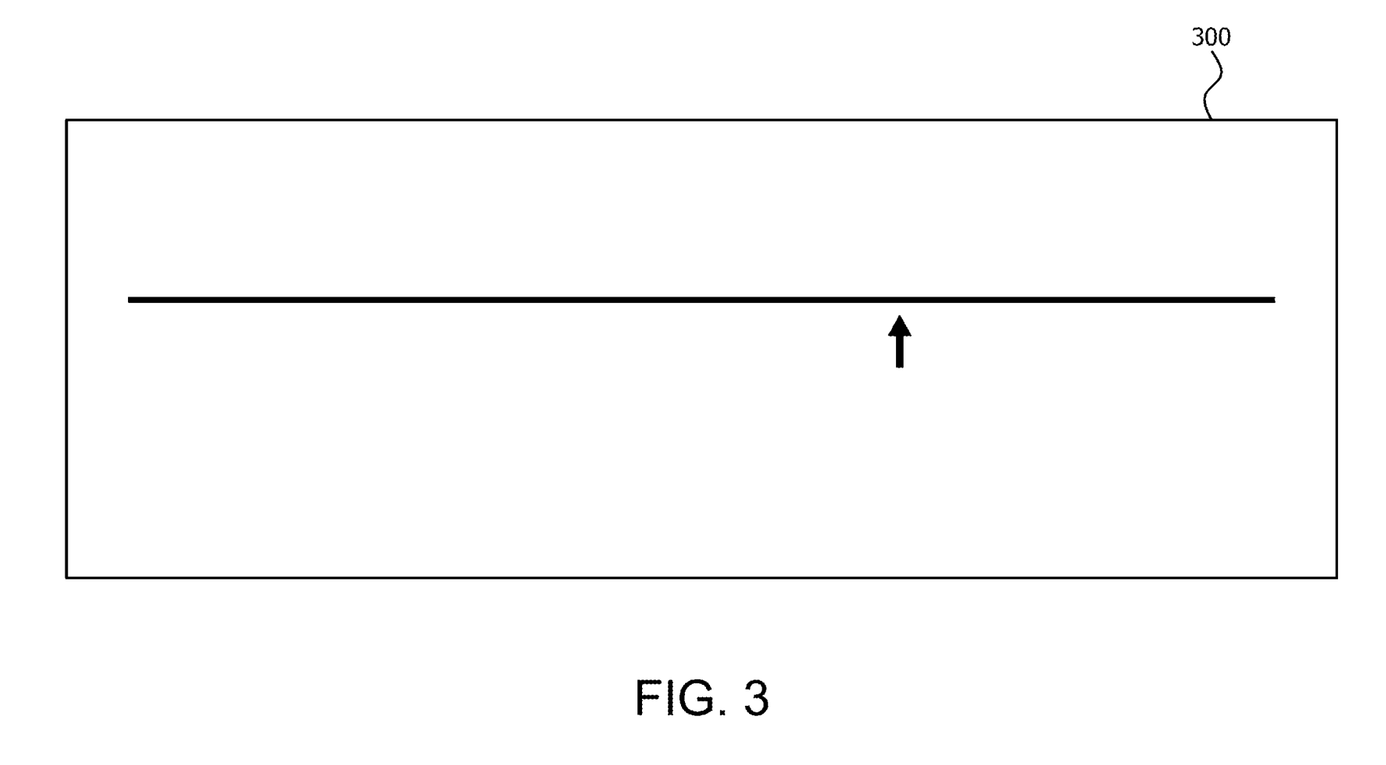
FIG. 3 illustrates a user interface control configured to specify a power management preference.

FIG. 3 illustrates a user interface control 300 configured to specify a power management preference for a computing device (e.g., device 100 as shown and described with respect to FIGS. 1 and 2, or components thereof, such as processor 102, or APD 116). In some implementations, user interface control 300 is configured to specify a power management preference for any suitable computing device (e.g., desktop computer, laptop computer, tablet computer, smart phone, gaming console, etc.).

In this example, interface control 300 is displayed on a monitor or other display (e.g., of output devices 110 as shown and described with respect to FIG. 1). In some implementations, user interface control 200 is displayed on any suitable output device (e.g., touchscreen, headset, etc.). Interface control 300 and is manipulatable by a user via a mouse or other input device (e.g., of input devices 108) to specify the power management preference. In some implementations, interface control 300 is manipulatable by a user via any suitable input device (e.g., keyboard, stylus, touchscreen, game controller, etc.)

FIG. 3 depicts user interface control 300 as a slider having 4 positions, ranging between a leftmost position indicating a preference for power efficiency (e.g., "best battery life") and a rightmost position indicating a preference for computing performance (e.g., "best performance"). FIG. 3 shows the user interface control 300 in an example rightmost position indicating a user preference for computing performance.

In some implementations, the interface control can have any suitable form or be of any suitable type (e.g., radio buttons, check boxes, switches, numeric input, etc.) and can include an arbitrary number of positions, or an effectively continuous range of positions. Throughout the disclosure, manipulation of the user interface control is referred to as a move or slide for illustration and ease of description, however in other implementations the control operation includes (or is described or expressed as) clicking, pressing, selecting, entering, or any other suitable user interface operation. In some implementations, the interface control includes additional sliders or other controls or axes (e.g., to specify performance for different devices (e.g., CPU, GPU, display, wireless connectivity, etc.)

Figure 4:
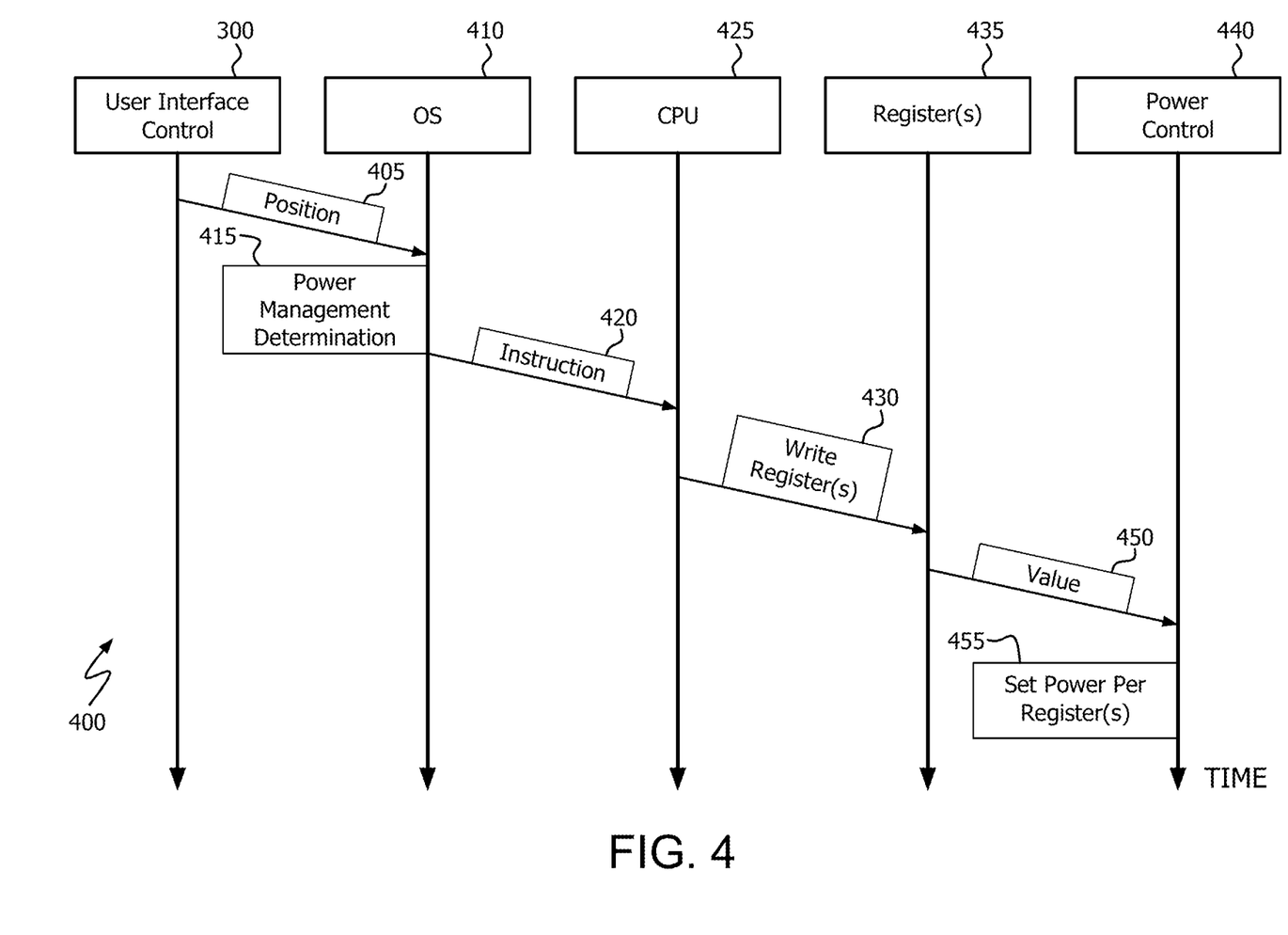
FIG. 4 is a message sequence chart illustrating example performance and power tuning operations.

FIG. 4 is a message sequence chart 400 illustrating example performance and power tuning operations for a computing device (e.g., device 100 as shown and described with respect to FIGS. 1 and 2, or components thereof, such as processor 102, or APD 116).

After a user manipulates user interface control 300, an operating system (OS) 410 detects the user interface control position 405 and performs a power management determination 415 based on the user interface control position 405. Power management determination 415 determines suitable power management interventions based on the user preference expressed by interface control position 405 and potentially other factors. In some implementations, such factors include hardware specifications of the computing system or components thereof, metrics regarding current and/or historical and/or projected computing or memory access loads, or any other factors suitable for determining power management. In some implementations, such factors include processor power management settings to determine a power (e.g., CPU core power) for different positions of user interface control position 405. In some implementations, such settings are profiled offline on a per-platform basis. In some implementations, the settings are platform-specific.

Based on the power management determination 415, the operating system 410 determines appropriate power management parameters for the computing device 100. In some implementations, the parameters include maximum voltage (e.g., per voltage domain, processor, device, etc.), maximum power utilization, a maximum number of CPU cores to use for computations, a number of cores to shut down or power gate, a subset of voltage domains to shut down or gate, a maximum clock frequency (e.g., per clock domain), or any other suitable power management parameter. These parameters may apply to some or all processors and/or other devices. Using the example of device 100, the parameters may apply to processor 102.

OS 410 executes an instruction 420 on CPU 425 (e.g., processor 102 in the example of device 100) based on the parameters. CPU 425 executes instruction 420 to perform a write operation 430 to write information to one or more specific hardware registers 435 reflecting the power management parameters. A power controller 440 (e.g., implemented on processor 102 or any other suitable unit of device 100) receives a hardware interrupt based on the change in registers 435 and obtains the register values 450. Power controller 440 effects one or more power management interventions 455 based on the values 450. In some implementations, such power management interventions 455 correspond to the power management parameters determined by the OS 410. In some implementations, the power management interventions 455 include setting a maximum voltage (e.g., per voltage domain, processor, device, etc.), maximum power utilization, a maximum number of CPU cores to use for computations, a number of cores to shut down or power gate, a subset of voltage domains to shut down or gate, a maximum clock frequency (e.g., per clock domain), or any other suitable power management parameter. In some implementations, some such power interventions may be governed by settings of another control, or by a combination of the user interface control 300 and one or more other controls.

Figure 5:
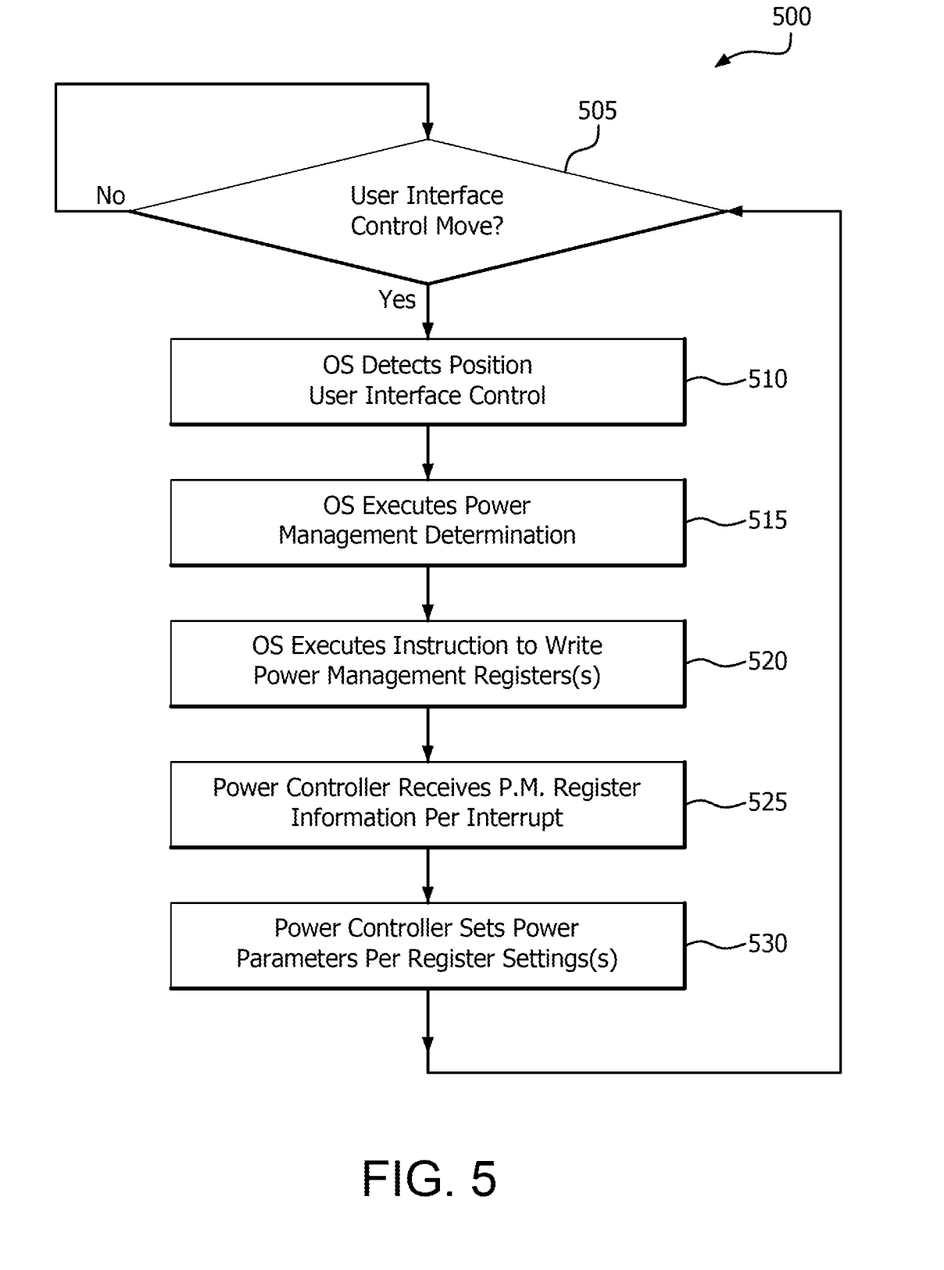
FIG. 5 is a flow chart illustrating the example performance and power tuning operations of FIG. 4.

FIG. 5 is a flow chart 500 illustrating the example performance and power tuning operations of FIG. 4. On a condition 505 that a user manipulates a user interface control (e.g., user interface control 300 as shown and described with respect to FIG. 3), the OS detects the user interface control position in step 510 and performs a power management determination in step 515. The power management determination determines suitable power management interventions based on the user preference expressed by interface control position 405 and potentially other factors. In some implementations, such factors include hardware specifications of the computing system or components thereof, metrics regarding current and/or historical and/or projected computing or memory access loads, or any other factors suitable for determining power management.

Based on the power management determination, the OS executes an instruction to write configuration information to one or more power management registers in step 520. The power management registers are hardware or architectural registers designated to store configuration for a power controller of a CPU, or other suitable power management circuitry.

In step 525, the power controller receives an interrupt to read the configuration information from the power management registers.

In step 530, the power controller adjusts power settings according to the register settings. In some implementations, the power settings include a maximum voltage (e.g., per voltage domain, processor, device, etc.), maximum power utilization, a maximum number of CPU cores to use for computations, a number of cores to shut down or power gate, a subset of voltage domains to shut down or gate, a maximum clock frequency (e.g., per clock domain), or any other suitable power management parameter.

In some implementations, the approach to performance and power tuning illustrated with respect to FIGS. 4 and 5 relies on the implementation of specific registers designated to hold power configuration information. It may be desired to provide power management that does not rely on specially designated power configuration registers.

Figure 6:
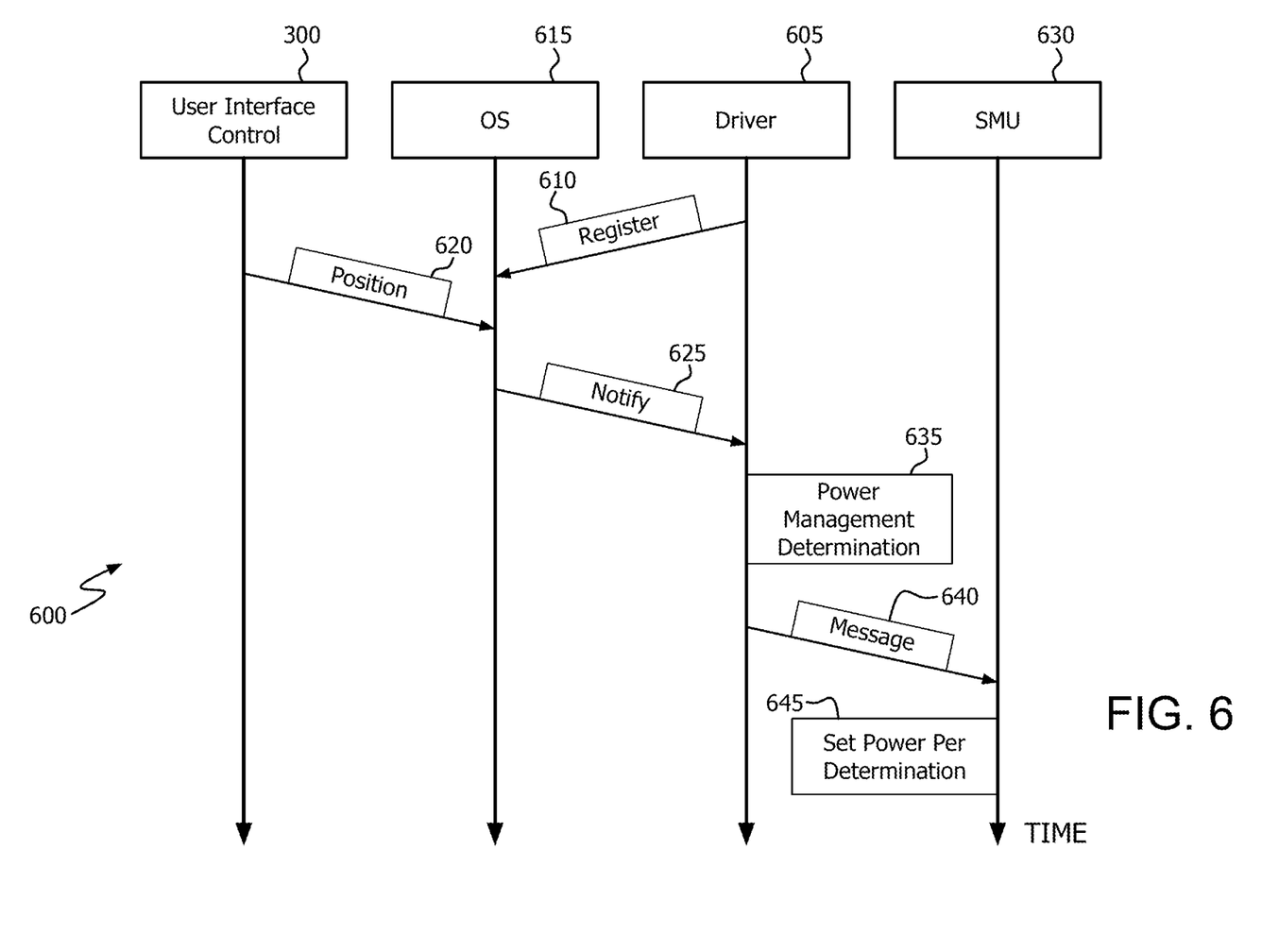
FIG. 6 is a message sequence chart illustrating example performance and power tuning operations.

FIG. 6 is a message sequence chart 600 illustrating example performance and power tuning operations for a computing device (e.g., device 100 as shown and described with respect to FIGS. 1 and 2, or components thereof, such as processor 102, or APD 116). In some implementations, the example performance and power turning operations affect performance and power tuning of a discrete GPU (dGPU) In the example of FIG. 6, a computer graphics driver 605 (or other suitable driver) is registered (e.g, via communication 610) with OS 615 to receive a notification of the position of user interface control 300 (e.g., if the control moves, at a particular interval, based on other events, etc.).

After a user manipulates user interface control 300, OS 615 detects the user interface control position 620 and sends a notification 625 which indicates the user interface control position 620 to driver 605.

Driver 605 performs a power management determination 635 based on the received user interface control position 620. Power management determination 635 determines suitable power management interventions based on the user preference expressed by the user interface control position, and potentially other factors. In some implementations, such factors include hardware specifications of the computing system or components thereof, metrics regarding current and/or historical and/or projected computing or memory access loads, information indicating whether the computing system is operating on a power supply (e.g., wall current, uninterruptible power supply (UPS) etc.) or a battery, or any other factors suitable for determining power management.

Driver 605 communicates the power management determination in a message 640 to a system management unit (SMU) 630 (or other power controller or other suitable power and/or clock frequency management circuitry).

In step 645, the SMU adjusts power settings according to power management interventions received via message 640. In some implementations, the power settings include one or more of a maximum power limit or voltage (e.g., for the entire device, APU, CPU, GPU, per voltage domain, processor, device, etc.), maximum power utilization, a maximum number of CPU and/or GPU cores to use for computations, a number of cores to shut down or power gate, a subset of voltage domains to shut down or gate, a maximum clock frequency (e.g., per clock domain), or any other suitable power management parameter for the system globally or any particular processing units, groups of processing units, components, or groups of components.

Figure 7:
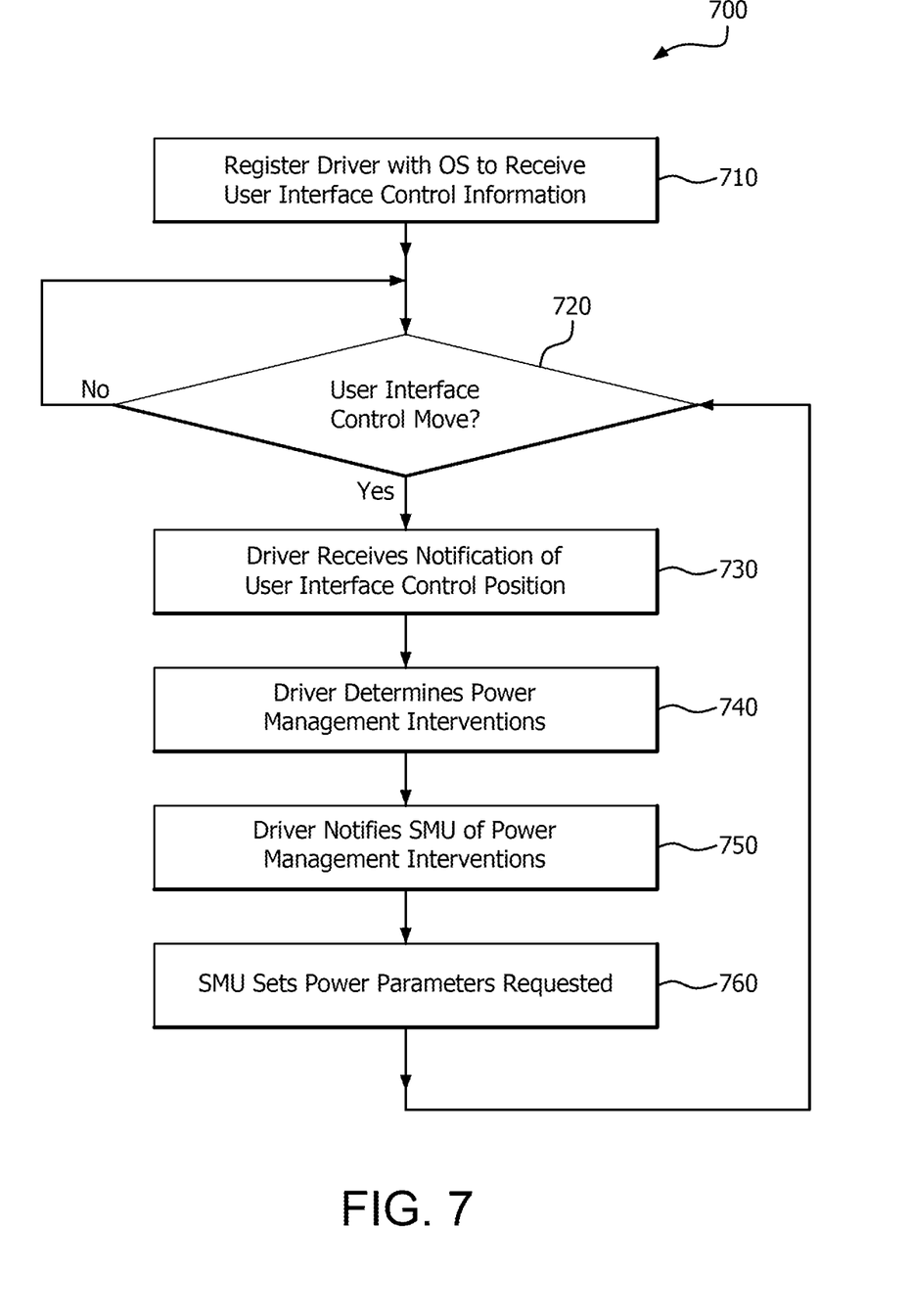
FIG. 7 is a flow chart illustrating the example performance and power tuning operations of FIG. 6

FIG. 7 is a flow chart 700 illustrating the example performance and power tuning operations of FIG. 6.

In step 710, a computer graphics driver (or other suitable driver) is registered with the OS 615 to receive a notification of the position of user interface control (e.g., user interface control 300). In some implementations, the driver is registered to receive the notification if the control moves. In some implementations, the driver is registered to receive the notification on other conditions (e.g., at a particular interval, based on other events, etc.) In some implementations (not shown) a proprietary interface executing on the computer system is configured to receive the notification of the position of the user interface control without a driver registered with the OS.

On a condition 720 that a user manipulates a user interface control (e.g., user interface control 300 as shown and described with respect to FIG. 3), the OS detects the user interface control position in and the driver receives notification of the user interface control position from the OS in step 730.

In step 740, the driver determines suitable power management interventions based on the user preference expressed by the user interface control position, and potentially other factors. In some implementations, such factors include hardware specifications of the computing system or components thereof, metrics regarding current and/or historical and/or projected computing or memory access loads, or any other factors suitable for determining power management. In some implementations, such factors include messages received by the SMU from the driver to adjust graphics clock frequency, multimedia engine frequency, system clock frequency, or any other clock frequency.

In step 750, the driver notifies an SMU (or other power controller or other suitable power management circuitry) of the user interface control position.

In step 760, the SMU adjusts power settings according to the power management interventions received in step 750. In some implementations, the power settings include a maximum voltage (e.g., per voltage domain, processor, device, etc.), maximum power utilization, a maximum number of CPU cores to use for computations, a number of cores to shut down or power gate, a subset of voltage domains to shut down or gate, a maximum clock frequency (e.g., per clock domain), or any other suitable power management parameter. In some implementations, the power settings include adjusting display backlight, adjusting frame rate to introduce idle time (e.g., to permit a graphics clock to idle), etc.

Figure 8:
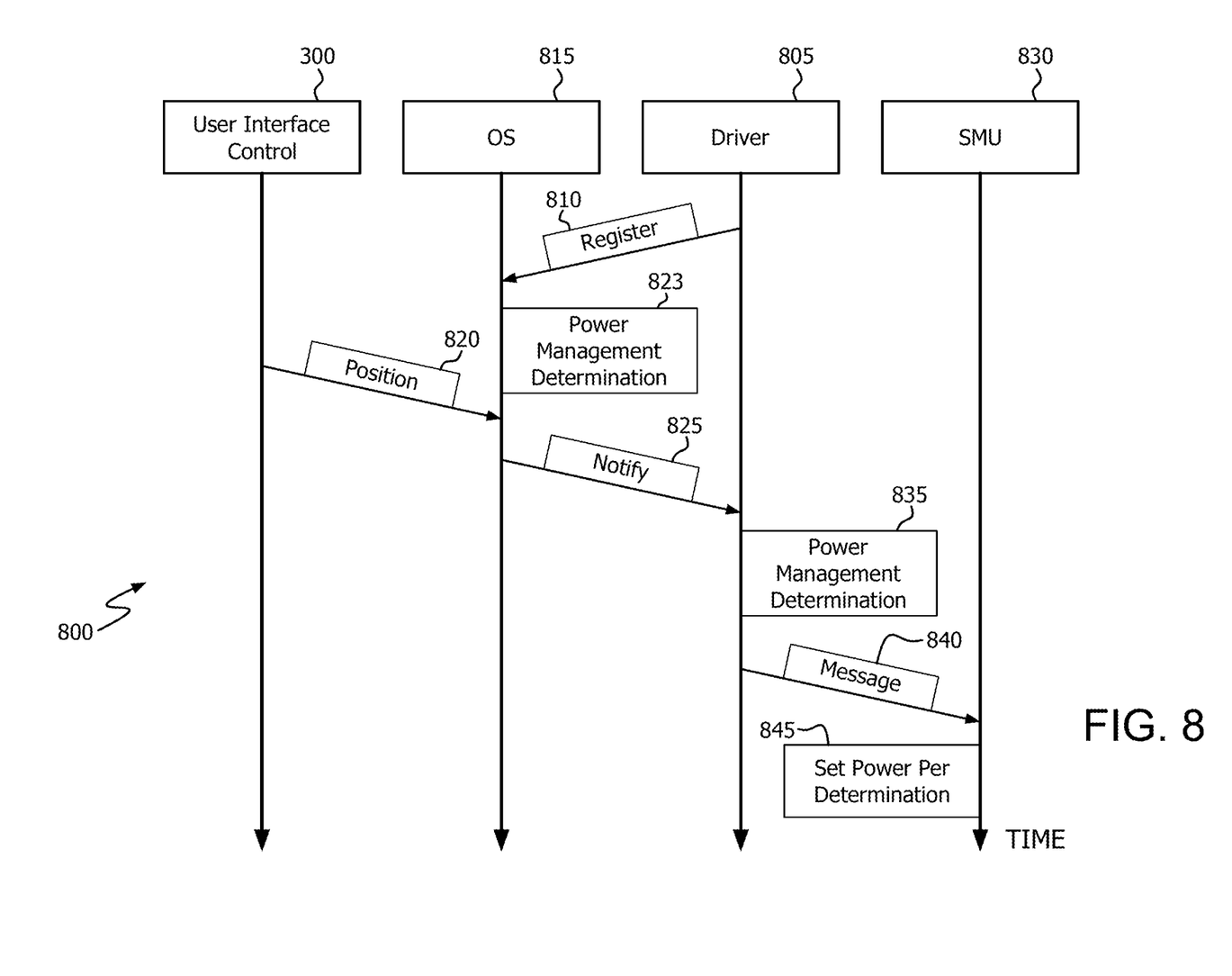
FIG. 8 is a message sequence chart illustrating example performance and power tuning operations.

FIG. 8 is a message sequence chart 800 illustrating example performance and power tuning operations for a computing device (e.g., device 100 as shown and described with respect to FIGS. 1 and 2, or components thereof, such as processor 102, or APD 116). In some implementations, the example performance and power turning operations affect performance and power tuning of an APU. In the example of FIG. 8, a computer graphics driver 805 (or other suitable driver) is registered (e.g., via communication 810) with OS 815 to receive a notification of the position of user interface control 300 (e.g., if the control moves, at a particular interval, based on other events, etc.).

After a user manipulates user interface control 300, OS 815 detects the user interface control position 820. In some implementations, OS 815 receives a different user input instead of, or in addition to, user interface control position 820.

In some implementations, OS 815 performs a power management determination 823 based on a trigger, such as a battery saver notification or other suitable trigger, or any other suitable input. OS 815 determines suitable power management interventions based on the trigger, and potentially other factors. In some implementations, such factors include hardware specifications of the computing system or components thereof, metrics regarding current and/or historical and/or projected computing or memory access loads, information indicating whether the computing system is operating on a power supply (e.g., wall current, uninterruptible power supply (UPS) etc.) or a battery, or any other factors suitable for determining power management.

OS 815 sends a notification 825 which indicates the user interface control position 620 and/or a different user input (and power management determination 823, if it is performed) to driver (e.g., a graphics driver) 805.

Driver 805 performs a power management determination 835 based on the received user interface control position 820. Driver 805 determines suitable power management interventions based on the user preference expressed by the user interface control position 820, and potentially other factors. In some implementations, such factors include hardware specifications of the computing system or components thereof, metrics regarding current and/or historical and/or projected computing or memory access loads, information indicating whether the computing system is operating on a power supply (e.g., wall current, uninterruptible power supply (UPS) etc.) or a battery, or any other factors suitable for determining power management.

Driver 805 communicates the power management determination in a message 840 to a SMU 830 (or other power controller or other suitable power management circuitry).

In operation 845, the SMU adjusts power settings according to power management interventions received via message 840. In some implementations, the power settings include one or more of a maximum power limit or voltage (e.g., for the entire device, APU, CPU, GPU, per voltage domain, processor, device, etc.), maximum power utilization, a maximum number of CPU and/or GPU cores to use for computations, a number of cores to shut down or power gate, a subset of voltage domains to shut down or gate, a maximum clock frequency (e.g., per clock domain), or any other suitable power management parameter for the system globally or any particular processing units, groups of processing units, components, or groups of components.

Figure 9:
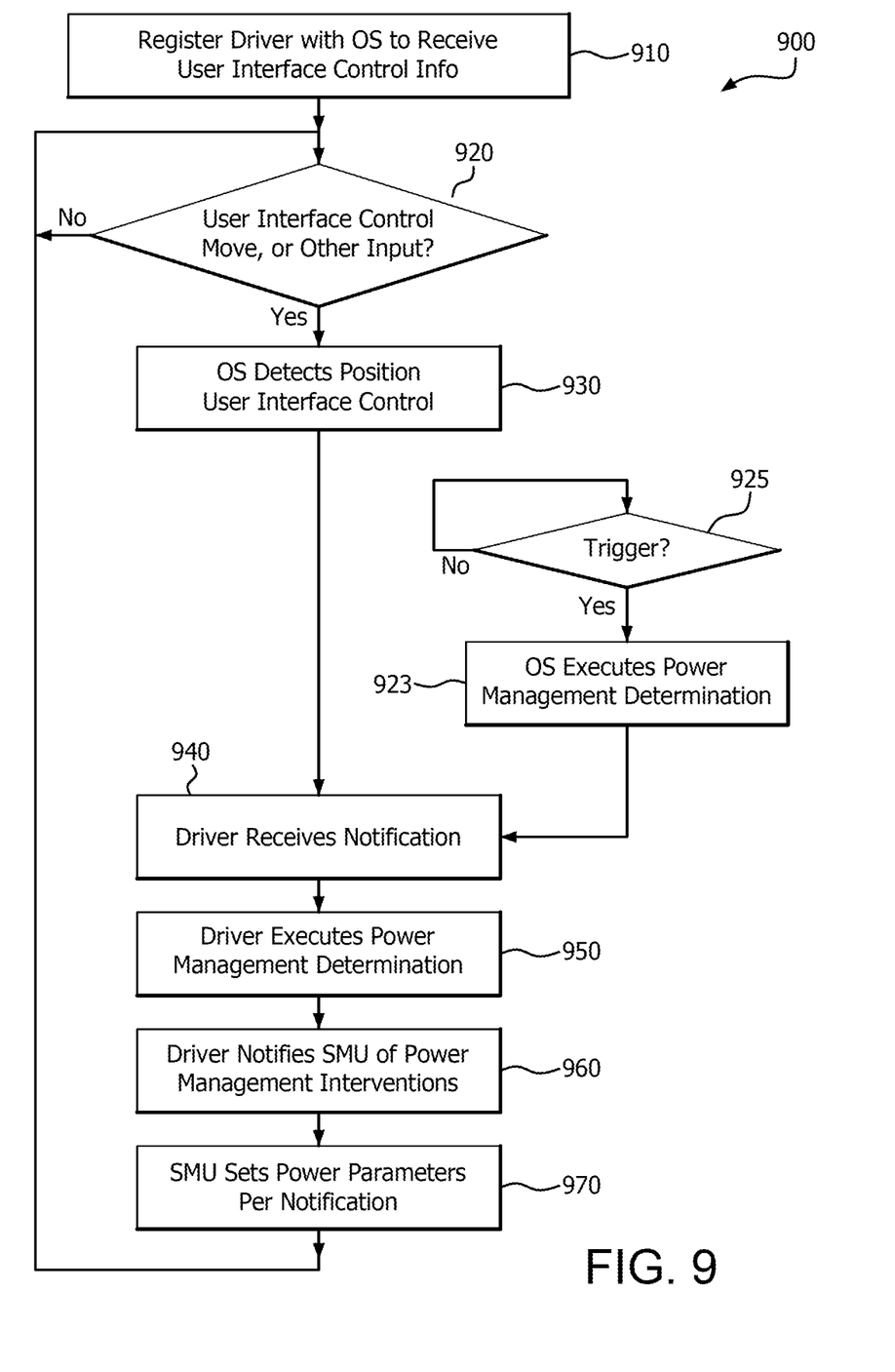
FIG. 9 is a flow chart illustrating the example performance and power tuning operations of FIG. 8.

FIG. 9 is a flow chart 900 illustrating the example performance and power tuning operations of FIG. 8.

In step 910, a computer graphics driver (or other suitable driver) is registered with the OS to receive a notification of the position of a user interface control (e.g., user interface control 300). In some implementations, the driver is registered to receive the notification if the control moves. In some implementations, the driver is registered to receive the notification on other conditions (e.g., at a particular interval, based on other events, based on a trigger, etc.)

On a condition 920 that a user manipulates a user interface control (e.g., user interface control 300 as shown and described with respect to FIG. 3), the OS detects the user interface control position in step 930. In some implementations, the OS detects a different user input instead of, or in addition to, user interface control position, on condition 920.

In some implementations, the OS performs a power management determination step 923 based on a trigger, such as a battery saver notification or other suitable trigger, on a condition 925 that the trigger occurs. The OS determines suitable power management interventions in determination step 923 based on the trigger, and potentially other factors. In some implementations, such factors include hardware specifications of the computing system or components thereof, metrics regarding current and/or historical and/or projected computing or memory access loads, information indicating whether the computing system is operating on a power supply (e.g., wall current, uninterruptible power supply (UPS) etc.) or a battery, or any other factors suitable for determining power management.

A driver (e.g., a graphics driver) receives notification of the user interface control position and/or power management interventions from the OS in step 940.

The driver determines suitable power management interventions in step 950 based on the user preference expressed by the user interface control position, and potentially other factors. In some implementations, such factors include a power management determination by the OS (e.g., per step 923), hardware specifications of the computing system or components thereof, metrics regarding current and/or historical and/or projected computing or memory access loads, information indicating whether the computing system is operating on a power supply (e.g., wall current, uninterruptible power supply (UPS) etc.) or a battery, or any other factors suitable for determining power management.

In step 760, the driver notifies an SMU (or other power controller or other suitable power management circuitry) of the determined power management interventions. In step 770, the SMU adjusts power settings according to the power management interventions received in step 760. In some implementations, the power settings include a maximum voltage (e.g., per voltage domain, processor, device, etc.), maximum power utilization, a maximum number of CPU cores to use for computations, a number of cores to shut down or power gate, a subset of voltage domains to shut down or gate, a maximum clock frequency (e.g., per clock domain), or any other suitable power management parameter. In some implementations, the power settings include adjusting display backlight, adjusting frame rate, and introducing idle time (e.g., to permit a graphics clock to idle), etc.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for power management in a computing device, the method comprising:
   transmitting, by an operating system (OS) executing on the computing device to a driver, a first notification;
   receiving, by the driver, the first notification;
   determining, by the driver, based on the first notification, a power management intervention;
   transmitting, by the driver to power control circuitry, a second notification of the determined power management intervention; and
   setting, by the power control circuitry, a power setting of the computing device based on the determined power management intervention.

2. The method of claim 1, wherein the driver comprises a graphics driver.

3. The method of claim 1, wherein the driver receives the first notification on a periodic basis.

4. The method of claim 1, wherein the computing device comprises a central processing unit (CPU).

5. The method of claim 1, wherein the power control circuitry comprises a system management unit (SMU).

6. The method of claim 1, wherein the power control circuitry is implemented on a central processing unit (CPU).

7. The method of claim 1, wherein the power management intervention comprises setting a maximum voltage or maximum power of the computing device.

8. The method of claim 1, wherein the power management intervention comprises setting a maximum voltage or maximum power for a specific power domain of the computing device.

9. The method of claim 1, wherein the power management intervention comprises setting a maximum clock frequency or maximum power of the computing device.

10. The method of claim 1, wherein the power management intervention comprises setting a maximum clock frequency for a specific clock domain of the computing device.

11. A computing device configured for power management, comprising:
circuitry configured to
transmit, by an operating system (OS) executing on the computing device to a driver, a first notification;
receive, by the driver from the OS, the first notification;
determine, by the driver, based on the first notification, a power management intervention;
transmit, by the driver to power control circuitry, a second notification of the determined power management intervention; and
set, by the power control circuitry, a power setting of the computing device based on the determined power management intervention.

12. The computing device of claim 11, wherein the driver comprises a graphics driver.

13. The computing device of claim 11, wherein the driver receives the first notification of on a periodic basis.

14. The computing device of claim 11, wherein the computing device comprises a central processing unit (CPU).

15. The computing device of claim 11, wherein the power control circuitry comprises a system management unit (SMU).

16. The computing device of claim 11, wherein the power control circuitry is implemented on a central processing unit (CPU).

17. The computing device of claim 11, wherein the power management intervention comprises setting a maximum voltage or maximum power of the computing device.

18. The computing device of claim 11, wherein the power management intervention comprises setting a maximum voltage or maximum power for a specific power domain of the computing device.

19. The computing device of claim 11, wherein the power management intervention comprises setting a maximum clock frequency or maximum power of the computing device.

20. The computing device of claim 11, wherein the power management intervention comprises setting a maximum clock frequency for a specific clock domain of the computing device.

* * * * *